US012776454B2

(12) United States Patent
Nagamitsu et al.

(10) Patent No.: US 12,776,454 B2
(45) Date of Patent: Oct. 27, 2026

(54) ELECTROCHEMICAL DEVICE WITH HIGH CAPACITY AND HIGH DURABILITY

(71) Applicant: Panasonic Intellectual Property Management Co., Ltd., Osaka (JP)

(72) Inventors: Kenichi Nagamitsu, Kyoto (JP); Nobuhiro Shimamura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 834 days.

(21) Appl. No.: 17/998,946

(22) PCT Filed: May 18, 2021

(86) PCT No.: PCT/JP2021/018830

§ 371 (c)(1),
(2) Date: Nov. 16, 2022

(87) PCT Pub. No.: WO2021/251075

PCT Pub. Date: Dec. 16, 2021

(65) Prior Publication Data

US 2023/0231133 A1 Jul. 20, 2023

(30) Foreign Application Priority Data

Jun. 9, 2020 (JP) ................................. 2020-100392

(51) Int. Cl.
*H01G 11/28* (2013.01)
*H01G 11/06* (2013.01)
(Continued)

(52) U.S. Cl.
CPC ............. *H01G 11/28* (2013.01); *H01G 11/06* (2013.01); *H01G 11/26* (2013.01); *H01G 11/32* (2013.01);
(Continued)

(58) Field of Classification Search
None
See application file for complete search history.

(56) References Cited

U.S. PATENT DOCUMENTS

2008/0055819 A1 3/2008 Taguchi et al.
2012/0218683 A1 8/2012 Kondou et al.
(Continued)

FOREIGN PATENT DOCUMENTS

CN 103201805 A 7/2013
JP 2005166469 A * 6/2005
(Continued)

OTHER PUBLICATIONS

International Search Report of PCT application No. PCT/JP2021/018830 dated Aug. 10, 2021.
(Continued)

*Primary Examiner* — Eric W Thomas
(74) *Attorney, Agent, or Firm* — Rimon P.C.

(57) ABSTRACT

An electrochemical device includes a positive electrode, a negative electrode, and an electrolyte having lithium ion conductivity. The positive electrode includes a positive current collector and a positive electrode mixture layer supported on the positive current collector. The positive electrode mixture layer contains a positive electrode active material reversibly doped with an anion. The negative electrode includes a negative current collector and a negative electrode mixture layer supported on the negative current collector. The negative electrode mixture layer contains a negative electrode active material reversibly doped with lithium ions. The negative electrode active material contains non-graphitizable carbon. A ratio Mp/Mn of a mass Mp of the positive electrode active material supported on a unit area of the positive electrode to a mass Mn of the negative electrode active material supported on a unit area of the negative electrode is in a range from 1.1 to 2.5, inclusive.

20 Claims, 1 Drawing Sheet

(51) Int. Cl.

| | |
|---|---|
| ***H01G 11/26*** | (2013.01) |
| ***H01G 11/32*** | (2013.01) |
| ***H01G 11/50*** | (2013.01) |
| ***H01G 11/66*** | (2013.01) |
| *H01M 4/02* | (2006.01) |

(52) U.S. Cl.

CPC ....... *H01G 11/50* (2013.01); *H01M 2004/021* (2013.01); *H01M 2004/027* (2013.01); *H01M 2300/008* (2013.01)

(56) References Cited

U.S. PATENT DOCUMENTS

| | | | | |
|---|---|---|---|---|
| 2013/0208404 | A1 | 8/2013 | Yasuda et al. | |
| 2015/0372274 | A1* | 12/2015 | Hamon | H01M 50/449 429/144 |
| 2022/0013764 | A1 | 1/2022 | Nakamura et al. | |
| 2022/0140322 | A1* | 5/2022 | Chen | H01M 10/0525 429/213 |

FOREIGN PATENT DOCUMENTS

| | | | | |
|---|---|---|---|---|
| JP | 2006-303330 A | | 11/2006 | |
| JP | 2006-310412 | | 11/2006 | |
| JP | 2010-114206 A | | 5/2010 | |
| JP | 4971729 B | | 7/2012 | |
| JP | 2016-186886 | | 10/2016 | |
| KR | 20060028121 A | * | 3/2006 | H01M 10/0567 |
| WO | 2011/058748 | | 5/2011 | |
| WO | 2012/063545 | | 5/2012 | |
| WO | 2020/111094 A1 | | 6/2020 | |

OTHER PUBLICATIONS

English Translation of Office Action Report dated Mar. 27, 2025 for the related Chinese Patent Application No. 202180041692.2.

* cited by examiner

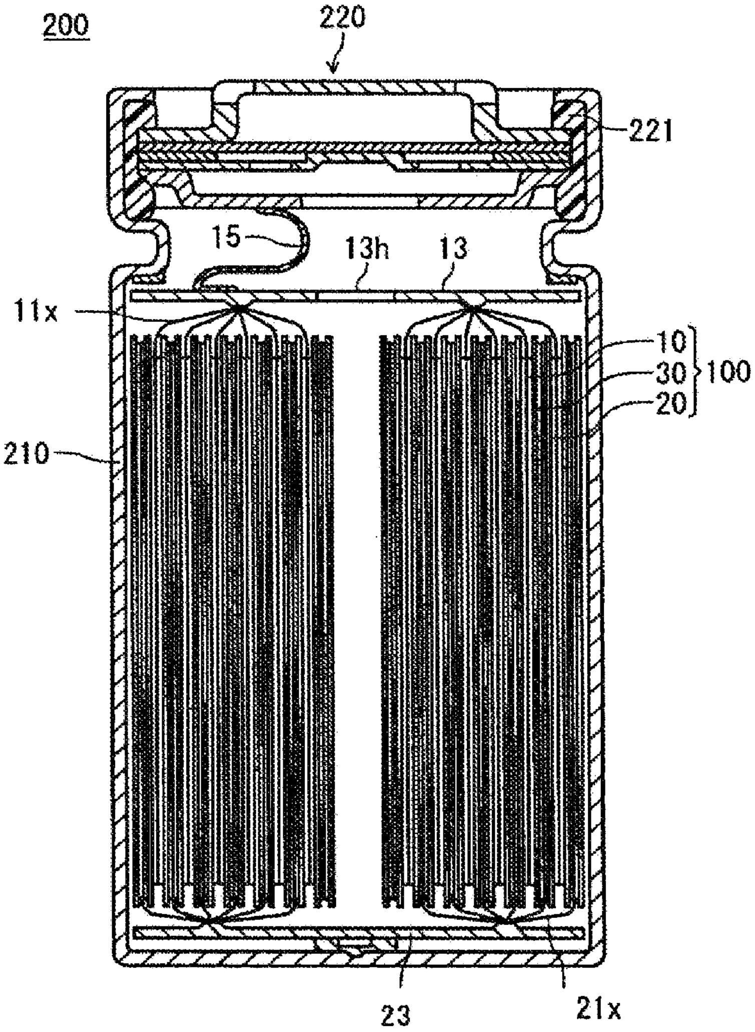
200
220
221
15
13h
13
11x
10
30
100
20
210
23
21x

ELECTROCHEMICAL DEVICE WITH HIGH CAPACITY AND HIGH DURABILITY

CROSS-REFERENCE TO RELATED APPLICATIONS

This application is a U.S. national stage application of the PCT International Application No. PCT/JP2021/018830 filed on May 18, 2021, which claims the benefit of foreign priority of Japanese patent application No. 2020-100392 filed on Jun. 9, 2020, the contents all of which are incorporated herein by reference.

TECHNICAL FIELD

The present invention relates to an electrochemical device.

BACKGROUND ART

In recent years, electrochemical devices in which the electricity storage principles of a lithium ion secondary battery and electric double layer capacitor are combined have attracted attention. Such electrochemical devices typically use a polarizable electrode for a positive electrode and a non-polarizable electrode for a negative electrode. As a result, the electrochemical devices are expected to have both the high energy density of a lithium ion secondary battery and the high output characteristic of an electric double layer capacitor.

Japanese Patent No. 4971729 proposes a lithium ion capacitor including a positive electrode, a negative electrode, and an aprotic organic solvent electrolyte solution of a lithium salt as an electrolytic solution, wherein a positive electrode active material is a material capable of being doped and dedoped with lithium ions or anions, a negative electrode active material is a material capable of being doped and dedoped with lithium ions, the negative electrode or the positive electrode is doped with lithium ions such that the positive electrode has a potential of less than or equal to 2 V (vs. Li/Li+) after the positive electrode and the negative electrode are short-circuited, the positive electrode has a positive electrode layer formed with a same thickness on both sides of a current collector, the positive electrode layer has a total thickness of 18 μm to 108 μm, and the positive electrode active material has a total basis weight of 1.5 mg/cm2 to 4.0 mg/cm2.

Unexamined Japanese Patent Publication No. 2006-310412 proposes a lithium ion capacitor including a positive electrode, a negative electrode, and an aprotic organic solvent electrolyte solution of a lithium salt as an electrolytic solution, wherein a positive electrode active material is a material capable of reversibly supporting lithium ions or anions, a negative electrode active material is a material capable of reversibly supporting lithium ions, the negative electrode or the positive electrode is doped with lithium ions before charging such that the positive electrode has a potential of less than or equal to 2.0 V after the positive electrode and the negative electrode are short-circuited, and the negative electrode active material is a heat treated product of a carbon material precursor in the presence of a transition metal-containing material.

International Publication No. 2011-58748 proposes an electrochemical capacitor including: an element including a negative electrode in which a negative electrode layer containing a carbon material in which lithium ions are occluded is formed on a surface of a current collector, a positive electrode in which a positive electrode layer that adsorbs ions is formed on a surface of a current collector, and a separator interposed between the negative electrode and the positive electrode; an electrolytic solution containing lithium ions; and an exterior body that accommodates the element and the electrolytic solution, wherein a coating film containing lithium carbonate is formed on a surface of the carbon material contained in the negative electrode layer.

SUMMARY OF THE INVENTION

However, it is difficult for the electrochemical devices as described above to achieve both high capacity and high durability, which are in a trade-off relation. The electrochemical devices need further improvement.

One aspect of the present invention relates to an electrochemical device including a positive electrode, a negative electrode, and an electrolyte having lithium ion conductivity, wherein the positive electrode includes a positive current collector and a positive electrode mixture layer supported on the positive current collector, the positive electrode mixture layer contains a positive electrode active material reversibly doped with an anion, the negative electrode includes a negative current collector and a negative electrode mixture layer supported on the negative current collector, the negative electrode mixture layer contains a negative electrode active material reversibly doped with lithium ions, the negative electrode active material contains non-graphitizable carbon, and a ratio Mp/Mn of a mass Mp of the positive electrode active material supported on a unit area of the positive electrode to a mass Mn of the negative electrode active material supported on a unit area of the negative electrode is in a range from 1.1 to 2.5, inclusive.

According to the present invention, it is possible to provide an electrochemical device that achieves both high capacity and high durability.

BRIEF DESCRIPTION OF THE DRAWING

FIG. 1 is a perspective view in which a part of an electrochemical device according to an exemplary embodiment of the present invention is cut out.

DESCRIPTION OF EMBODIMENT

An electrochemical device according to an exemplary embodiment of the present invention includes a positive electrode, a negative electrode, and an electrolyte having lithium ion conductivity. Typical positive electrode and negative electrode constitute an electrode body together with a separator interposed therebetween. The electrode body is configured as, for example, a columnar wound body in which a band-shaped positive electrode and a band-shaped negative electrode are wound with a separator interposed therebetween. The electrode body may also be formed as a stacked body in which a plate-shaped positive electrode and a plate-shaped negative electrode are stacked with a separator interposed therebetween.

The positive electrode includes a positive current collector and a positive electrode mixture layer supported on the positive current collector. The positive electrode mixture layer contains a positive electrode active material reversibly doped with an anion. When an anion is adsorbed to the positive electrode active material, an electric double layer forms to develop a capacity. The positive electrode may be a polarizable electrode or may be an electrode that has the properties of a polarizable electrode and in which the Faraday reaction also contributes to the capacity.

The positive electrode active material may be a carbon material or a conductive polymer. The doping of the anion into the positive electrode active material is a concept that includes at least an adsorption phenomenon of the anion to the positive electrode active material and may include occlusion of the anion by the positive electrode active material and chemical interaction between the positive electrode active material and the anion.

The negative electrode includes a negative current collector and a negative electrode mixture layer supported on the negative current collector. The negative electrode mixture layer contains a negative active material reversibly doped with lithium ions, and the negative active material contains non-graphitizable carbon.

In the non-graphitizable carbon, the Faraday reaction in which lithium ions are reversibly occluded and released proceeds to develop a capacity. The doping of lithium ions into the negative electrode active material is a concept that includes at least an occlusion phenomenon of lithium ions into the negative electrode active material and may include adsorption of lithium ions to the negative electrode active material and chemical interaction between the negative electrode active material and lithium ions.

Hereinafter, the positive electrode and the negative electrode may be collectively referred to as electrodes. The positive current collector and the negative current collector may be collectively referred to as current collectors (or electrode current collectors). The positive electrode mixture layer and the negative electrode mixture layer may be collectively referred to as mixture layers (or electrode mixture layers). The positive electrode active material and the negative electrode active material may be collectively referred to as active materials (or electrode active materials).

The ratio of mass Mp of the positive electrode active material supported on the unit area of the positive electrode to mass Mn of the negative electrode active material supported on the unit area of the negative electrode: Mp/Mn is in a range from 1.1 to 2.5 inclusive, preferably in a range from 1.4 to 1.8 inclusive, and more preferably in a range from 1.5 to 1.8 inclusive. The electrochemical device having the Mp/Mn ratio described above can achieve a high capacity. When the Mp/Mn ratio is less than 1.1, a decrease in the electrostatic capacitance of the electrochemical device becomes remarkable. When the Mp/Mn ratio is more than or equal to 1.1, further, more than or equal to 1.4, particularly, more than or equal to 1.5, a high electrostatic capacitance is obtained. However, when the Mp/Mn ratio exceeds 2.5, the resistance (DCR) of the electrochemical device at a low temperature (hereinafter, referred to as low-temperature DCR) excessively increases. When Mp/Mn is less than or equal to 2.5, further, less than or equal to 1.8, a high electrostatic capacitance is obtained, and excessive increase in the low-temperature DCR can be inhibited, resulting in an electrochemical device excellent in balance of characteristics.

Mass Mp and mass Mn of the electrode active materials supported on the unit area of the electrodes are expressed by the following formulas, respectively.

*Mp*=(mass of positive electrode−mass of positive current collector)×mass ratio of positive electrode active material÷positive electrode area

*Mn*=(mass of negative electrode−mass of negative current collector)×mass ratio of negative electrode active material−negative electrode area The mass ratio of the positive electrode active material is a ratio of the mass of the positive electrode active material contained in the positive electrode mixture layer when the mass of the positive electrode mixture layer is 1. Similarly, the mass ratio of the negative electrode active material is a ratio of the mass of the negative electrode active material contained in the negative electrode mixture layer when the mass of the negative electrode mixture layer is 1. The positive electrode area is an area of a projection when the positive electrode is orthographically projected from the principal surface side of the positive electrode, and the negative electrode area is an area of a projection when the negative electrode is orthographically projected from the principal surface side of the negative electrode.

As the samples of the positive electrode and the negative electrode for determining Mp and Mn, uniform portions cut out from the electrodes in a thickness direction of the electrodes are used. For example, an electrode portion partially having an exposed part of a current collector is not used as the sample. An electrode portion in which a part where the electrode mixture layers are provided on both surfaces and one surface of a current collector is mixed is not used as the sample.

From the viewpoint of obtaining an electrochemical device having a high capacity density, mass Mp of the positive electrode active material supported on the unit area of the positive electrode may be, for example, in a range from 3.6 mg/cm$^2$ to 4.5 mg/cm$^2$ inclusive, and may be in a range from 3.9 mg/cm$^2$ to 4.2 mg/cm$^2$ inclusive. From the same viewpoint, mass Mn of the negative electrode active material supported on the unit area of the negative electrode may be, for example, in a range from 1.8 mg/cm$^2$ to 3.2 mg/cm$^2$ inclusive, and may be in a range from 2.3 mg/cm$^2$ to 2.8 mg/cm$^2$ inclusive. When an electrode mixture layer is provided on both surfaces of a current collector, the mass of the active material supported on the unit area of an electrode is calculated from the total amount of the active material on both surfaces of the current collector having the size of the unit area, as derived from the definition of the electrode area.

Next, the specific surface area of the negative electrode mixture layer may be, for example, in a range from 10 m$^2$/g to 70 m$^2$/g inclusive. The low-temperature DCR tends to increase as Mp/Mn increases, but when the specific surface area of the negative electrode mixture layer is more than or equal to 10 m$^2$/g, further, more than or equal to 25 m$^2$/g, increase in the low-temperature DCR is remarkably inhibited. That is, by setting the specific surface area to more than or equal to 10 m$^2$/g, further, more than or equal to 25 m$^2$/g, it becomes easy to select a large Mp/Mn ratio, and a high electrostatic capacitance can be easily achieved. When the specific surface area of the negative electrode mixture layer is less than or equal to 70 m$^2$/g, further, less than or equal to 50 m$^2$/g, the negative electrode is inhibited from deteriorating, and the durability of the electrochemical device is likely to improve. The deterioration of the negative electrode may be typically evaluated by an increase rate of the low-temperature DCR of the electrochemical device when float charging is performed at a high temperature by applying a constant voltage to the electrochemical device using an external DC power supply. The increase rate of the low-temperature DCR is a ratio of a difference (ΔDCR) between the initial low-temperature DCR and the low-temperature DCR after float charging to the initial low-temperature DCR of the electrochemical device. It can be said that the smaller the increase rate of the low-temperature DCR, the less the negative electrode deteriorates.

The specific surface area of the negative electrode mixture layer is a BET specific surface area determined using a measurement apparatus in accordance with JIS Z 8830 (for example, TriStar II 3020 manufactured by Shimadzu Corporation). Specifically, the electrochemical device is disassembled, and the negative electrode is taken out. A half cell is assembled using the negative electrode as a working electrode and a Li metal foil as a counter electrode, and Li in the negative electrode is dedoped until the negative electrode potential reaches 1.5 V. Next, the negative electrode dedoped with Li is washed with dimethyl carbonate (DMC) and dried. Thereafter, the negative electrode mixture layer is peeled off from the negative current collector, and about 0.5 g of a sample of the negative electrode mixture layer is collected.

Next, the collected sample is heated at 150° C. for 12 hours under a reduced pressure of less than or equal to 95 kPa, and thereafter, nitrogen gas is adsorbed to the sample whose mass is known to obtain an adsorption isotherm at a relative pressure in a range from 0 to 1. Then, the surface area of the sample is calculated from the monolayer adsorption amount of the gas obtained from the adsorption isotherm. Here, the specific surface area is determined from the following BET formula by the BET one-point method (relative pressure 0.3).

$$P/V(P0-P)=(1/VmC)+\{(C-1)/VmC\}(P/P0) \quad (1)$$

$$S=kVm \quad (2)$$

P0: saturated vapor pressure

P: adsorption equilibrium pressure

V: adsorption amount at adsorption equilibrium pressure P

Vm: amount of adsorbed monolayer

C: parameter related to adsorption heat and the like

S: specific surface area k: occupancy area of nitrogen single molecule of 0.162 $nm^2$ Next, the surface layer part of the negative electrode mixture layer may have a first layer containing lithium carbonate as a constituent element of the coating film. The first layer is mainly formed on the surface of the negative electrode active material. The negative electrode is more likely to deteriorate as the specific surface area of the negative composite layer increases, but the deterioration of the negative electrode is remarkably inhibited by forming the first layer.

The surface layer part of the negative electrode may have a second layer containing a solid electrolyte as a constituent element of the coating film. The second layer has a composition different from that of the first layer, and the second layer is distinguishable from the first layer. In an electrochemical device using lithium ions, a solid electrolyte interface coating film (that is, an SEI coating film) is formed on a negative electrode mixture layer during charging and discharging. The second layer may be formed as the SEI coating film. The SEI coating film serves an important function in charge-discharge reaction, but an excessively thick SEI coating film causes the negative electrode to greatly deteriorate. The first layer containing lithium carbonate has an action of promoting formation of a favorable SEI film and maintaining the SEI film in a favorable state when charging and discharging are repeated. Thus, formation of the first layer on the surface layer part of the negative electrode mixture layer enables the negative electrode to be remarkably inhibited from deteriorating even when the specific surface area of the negative electrode mixture layer is increased to inhibit an increase in the low-temperature DCR.

When the coating film has the first layer and the second layer, at least a part of the second layer covers at least a part of the surface of the negative electrode active material with the first layer interposed between the second layer and the negative electrode active material. That is, at least a part of the first layer is covered with the second layer. The first layer is interposed between the surface of the negative electrode active material and the second layer and serves as an underlayer of the second layer. The first layer serving as an underlayer causes the second layer to form as an SEI film in a favorable state.

The second layer may also contain lithium carbonate. When the second layer contains lithium carbonate, the content of lithium carbonate contained in the second layer is smaller than the content of lithium carbonate contained in the first layer. It is a necessary condition that the first layer containing a large amount of lithium carbonate is used as an underlayer for the second layer to form as an SEI film in a favorable state.

The first layer is formed on the surface layer part of the negative electrode mixture layer before the electrochemical device is assembled. In the electrochemical device assembled using the negative electrode, the second layer (SEI coating film) having a uniform and appropriate thickness is formed on the surface of the negative electrode active material by subsequent charging and discharging. The SEI coating film is formed, for example, by a reaction between an electrolyte and the negative electrode in the electrochemical device. Since the electrolyte can pass through not only the second layer but also the first layer, the entire surface layer part including the first layer and the second layer may be referred to as an SEI coating film, but in the present specification, the second layer is referred to as SEI coating film and distinguished from the first layer for convenience.

Presence of a region containing lithium carbonate such as the first layer may be confirmed by, for example, analysis of the surface layer part by X-ray photoelectron spectroscopy (XPS). The analysis method is not limited to XPS.

The thickness of the first layer may be, for example, more than or equal to 1 nm, may be more than or equal to 5 nm when a longer-term action is expected, and may be more than or equal to 10 nm when a more reliable action is expected. When the thickness of the first layer exceeds 50 nm, the first layer itself may be a resistance component. Thus, the thickness of the first layer may be less than or equal to 50 nm or may be less than or equal to 30 nm.

The thickness of the second layer may be, for example, more than or equal to 1 nm, may be more than or equal to 3 nm. It is sufficient that the thickness is more than or equal to 5 nm. When the thickness of the second layer exceeds 20 nm, the second layer itself may be a resistance component. Thus, the thickness of the second layer may be less than or equal to 20 nm or may be less than or equal to 10 nm.

The ratio A/B between thickness A of the first layer and thickness B of the second layer is preferably less than or equal to 1 from the viewpoint of reducing the initial low-temperature DCR. At this time, the thickness of the second layer is preferably less than or equal to 20 nm, and may be less than or equal to 10 nm. However, from the viewpoint of forming the second layer in a favorable state, A/B is desirably more than or equal to 0.1, and for example, the A/B ratio may be more than or equal to 0.2.

The thicknesses of the first layer and the second layer are measured by analyzing the surface layer part of the negative electrode mixture layer at a plurality of locations (at least five locations) of the negative electrode mixture layer. Then, the average of the thickness of the first layer or second layer obtained at the plurality of locations may be set as the thickness of the first layer or second layer. The negative electrode mixture layer provided to the measurement sample may be peeled off from the negative current collector. In this case, the coating film formed on the surface of the negative electrode active material constituting the vicinity of the surface layer part of the negative electrode mixture layer may be analyzed. Specifically, the negative electrode active material covered with the coating film may be collected from a region of the negative electrode mixture layer disposed on the surface opposite to the surface joined to the negative current collector and used for analysis.

In the XPS analysis of the surface layer part of the negative electrode mixture layer, for example, the surface layer part or the coating film formed on the surface of the negative active material is irradiated with an argon beam in a chamber of an X-ray photoelectron spectrometer, and changes in each spectrum attributed to C1s, O1s electrons, and the like with respect to the irradiation time are observed and recorded. At this time, from the viewpoint of avoiding analysis error, the spectrum of the outermost surface of the surface layer part may be ignored. The thickness of the region where the peak attributed to lithium carbonate is stably observed corresponds to the thickness of the first layer.

In the case of a negative electrode taken out from an electrochemical device after completion and predetermined aging or at least one charging and discharging, the surface layer part of the negative electrode mixture layer has an SEI coating film (that is, the second layer) containing a solid electrolyte. The thickness of the region where the peak attributed to the bond of a compound contained in the SEI coating film is stably observed corresponds to the thickness of the SEI coating film (that is, the thickness of the second layer).

As the compound contained in the SEI coating film, a compound containing an element that may be a label of the second layer is selected. As the element that may be a label of the second layer, for example, an element that is contained in the electrolyte and is substantially not contained in the first layer (for example, F) may be selected. As the compound containing an element that may be a label of the second layer, for example, LiF may be selected.

When the second layer contains LiF, a substantial F1s peak attributed to the LiF bond is observed when the second layer is measured by X-ray photoelectron spectroscopy. In this case, the thickness of the region where the peak attributed to the LiF bond is stably observed corresponds to the thickness of the second layer.

On the other hand, the first layer usually does not contain LiF, and a substantial peak of F1s attributed to the LiF bond is not observed even when the first layer is measured by X-ray photoelectron spectroscopy. Thus, the thickness of the region where the peak attributed to the LiF bond is not stably observed may be used as the thickness of the first layer.

In the SEI coating film, O1s peaks attributed to lithium carbonate may also be observed. However, since the SEI coating film generated in the electrochemical device has a composition different from that of the first layer formed in advance, the SEI coating film and the first layer can be distinguished from each other. For example, in the XPS analysis of the SEI coating film, an F1s peak attributed to the LiF bond is observed, but a substantial F1s peak attributed to the LiF bond is not observed in the first layer. In addition, the amount of lithium carbonate contained in the SEI coating film is very small. As the Li1s peak, a peak derived from a compound such as $ROCO_2Li$ or ROLi may be detected, for example.

When the first layer is analyzed by XPS, a second peak of O1s attributed to the Li—O bond may be observed in addition to the first peak of O1s attributed to the C═O bond. The region of the coating film present in the vicinity of the surface of the negative electrode active material may contain a slight amount of LiOH or $Li_2O$.

Specifically, when the first layer constituting the surface layer part of the negative electrode mixture layer is analyzed in a depth direction, a first region, in which a first peak (O1s attributed to the C═O bond) and a second peak (O1s attributed to the Li—O bond) are observed and a first peak intensity is larger than a second peak intensity, and a second region, in which the first peak and the second peak are observed and the second peak intensity is larger than the first peak intensity, may be observed in the order of increasing the distance from the outermost surface of the surface layer part. A third region in which the first peak is observed and the second peak is not observed may further be present, the third region being located closer to the outermost surface of the surface layer part than the first region. The third region is likely to be observed when the thickness of the lithium carbonate-containing region is large.

The magnitude of the peak intensity may be determined by the height of the peak from the baseline.

At the center in the thickness direction of the first layer, usually, the C1s peak attributed to the C—C bond is not substantially observed, or even when observed, the C1s peak is half or less of the peak intensity attributed to the C═O bond.

Next, a method for forming the first layer containing lithium carbonate on the surface layer part of the negative electrode mixture layer will be described. The step of forming the first layer may be performed by, for example, a gas phase method, a coating method, transfer, or the like.

Examples of the gas phase method include chemical vapor deposition, physical vapor deposition, and sputtering. For example, lithium carbonate may be attached to the surface of the negative electrode mixture layer by a vacuum vapor deposition apparatus. The pressure in a chamber of the apparatus during vapor deposition may be, for example, $10^{-2}$ Pa to $10^{-5}$ Pa, the temperature of a lithium carbonate evaporation source may be 400° C. to 600° C., and the temperature of the negative electrode mixture layer may be −20° C. to 80° C.

As the coating method, the first layer may be formed by coating a solution or dispersion containing lithium carbonate on a surface of the negative electrode using, for example, a microgravure coater and drying the solution or dispersion. The content of lithium carbonate in the solution or dispersion is, for example, 0.3 mass % to 2 mass %, and when a solution is used, the content of lithium carbonate may be a concentration equal to or lower than the solubility (for example, about 0.9 mass % to 1.3 mass % in the case of an aqueous solution at normal temperature).

Further, the negative electrode may be obtained by performing a step of forming the second layer containing a solid electrolyte so as to cover at least a part of the first layer. The surface layer part of the obtained negative electrode mixture layer has the first layer and the second layer. The second layer is formed such that at least a part of the second layer covers at least a part (preferably the whole) of the surface of the negative electrode active material with the first layer interposed therebetween (that is, the first layer is used as an underlayer.).

Since the step of forming the second layer is performed in a state where the negative electrode mixture layer and the electrolyte are in contact with each other, the step may also serve as at least part of a step of pre-doping the negative electrode mixture layer with lithium ions. As a source of the lithium ions to be pre-doped, for example, metal lithium may be used.

Metal lithium may be attached to the surface of the negative electrode mixture layer. The first layer containing lithium carbonate having a thickness of, for example, in a range from 1 nm to 50 nm inclusive may also be formed by exposing the negative electrode having the negative electrode mixture layer to which metal lithium is attached to a carbon dioxide gas atmosphere.

The step of attaching metal lithium to the surface of the negative electrode mixture layer may be performed by, for example, a gas phase method, transfer, or the like. Examples of the gas phase method include chemical vapor deposition, physical vapor deposition, and sputtering. For example, metal lithium may be formed into a film on the surface of the negative electrode mixture layer by a vacuum vapor deposition apparatus. The pressure in a chamber of the apparatus during vapor deposition may be, for example, $10^2$ Pa to $10^{-5}$ Pa, the temperature of a lithium evaporation source may be 400° C. to 600° C., and the temperature of the negative electrode mixture layer may be −20° C. to 80° C.

The carbon dioxide gas atmosphere is preferably a dry atmosphere that does not contain moisture, and may have, for example, a dew point of less than or equal to −40° C. or less than or equal to −50° C. The carbon dioxide gas atmosphere may contain gases other than carbon dioxide, but the molar fraction of carbon dioxide is preferably more than or equal to 80%, more preferably more than or equal to 95%. It is desirable that the carbon dioxide gas atmosphere does not contain an oxidizing gas, and the molar fraction of oxygen may be less than or equal to 0.1%.

To form the first layer to be thicker, it is efficient that the partial pressure of carbon dioxide is made larger than, for example, 0.5 atm ($5.05\times10^4$ Pa), and may be more than or equal to 1 atm ($1.01\times10^5$ Pa).

The temperature of the negative electrode exposed to the carbon dioxide gas atmosphere may be, for example, in the range from 15° C. to 120° C. The higher the temperature, the thicker the first layer.

The thickness of the first layer may be easily controlled by changing the time for exposing the negative electrode to the carbon dioxide gas atmosphere. The exposure time may be, for example, more than or equal to 12 hours and less than 10 days.

It is desirable that the step of forming the first layer is performed before the electrode body is formed, but performing the third step after the electrode body is formed is not excluded. That is, the first layer may be formed on the surface layer part of the negative electrode mixture layer by preparing a positive electrode, preparing a negative electrode having a negative electrode mixture layer to which metal lithium is attached, forming an electrode body with a separator interposed between the positive electrode and the negative electrode, and exposing the electrode body to a carbon dioxide gas atmosphere.

The step of pre-doping the negative electrode mixture layer with lithium ions further proceeds, for example, by bringing the negative electrode mixture layer and the electrolyte into contact with each other, and is completed by being left for a predetermined time. Such a step may be a step of forming the second layer so as to cover at least a part of the first layer. For example, by charging and discharging the electrochemical device at least once, the second layer may be formed in the negative electrode mixture layer, and pre-doping of lithium ions to the negative electrode may be completed. For example, the pre-doping of the lithium ions to the negative electrode may also be completed by applying a predetermined charge voltage (for example, 3.4 V to 4.0 V) between the terminals of the positive electrode and the negative electrode for a predetermined time (for example, 1 hour to 75 hours).

FIG. 1 is a perspective view of electrochemical device 200 according to an exemplary embodiment of the present invention. Electrochemical device 200 includes electrode body 100, a nonaqueous electrolyte (not illustrated), bottomed cell case 210 made of metal, which accommodates electrode body 100 and the nonaqueous electrolyte, and sealing plate 220 that seals an opening of cell case 210. Gasket 221 is provided on the peripheral edge of sealing plate 220, and the open end of cell case 210 is crimped with gasket 221, whereby the inside of cell case 210 is sealed. Positive current collecting plate 13 having through hole 13*h* in the center is welded to positive current collector exposed part 11*x*. The other end of tab lead 15 having one end connected to positive current collecting plate 13 is connected to an inner surface of sealing plate 220. Thus, sealing plate 220 has a function as an external positive electrode terminal. On the other hand, negative current collecting plate 23 is welded to negative current collector exposed part 21*x*. Negative current collecting plate 23 is directly welded to a welding member provided on the inner bottom surface of cell case 210. Thus, cell case 210 has a function as an external negative electrode terminal.

Hereinafter, each component of the electrochemical device according to the exemplary embodiment of the present invention will be described in more detail.

(Negative Electrode)

The negative electrode includes a negative current collector and a negative electrode mixture layer supported on the negative current collector. The negative electrode mixture layer contains a negative electrode active material reversibly doped with lithium ions. The negative electrode active material contains non-graphitizable carbon (that is, hard carbon). The thickness of the negative electrode mixture layer is, for example, 10 μm to 300 μm per surface of the negative current collector.

A sheet-shaped metallic material is used as the negative current collector. The sheet-shaped metallic material may be a metal foil, a porous metal body, an etched metal, or the like. As the metallic material, copper, copper alloy, nickel, stainless steel, or the like may be used.

The negative current collecting plate is a metal plate having a substantially disk shape. The material of the negative current collecting plate is, for example, copper, copper alloy, nickel, stainless steel, or the like. The material of the negative current collecting plate may be the same as the material of the negative current collector.

The non-graphitizable carbon may have an interplanar spacing (that is, the interplanar spacing between a carbon layer and a carbon layer) of the (002) plane d002 of more than or equal to 3.8 Å as measured by an X-ray diffraction method. The theoretical capacity of the non-graphitizable carbon is desirably, for example, more than or equal to 150 mAh/g. By using non-graphitizable carbon, a negative electrode having a small low-temperature DCR and small expansion and contraction accompanying charging and discharging is likely to be obtained. The non-graphitizable carbon desirably accounts for more than or equal to 50 mass %, further, more than or equal to 80 mass %, and further, more than or equal to 95 mass % of the negative electrode active material. The non-graphitizable carbon desirably accounts for more than or equal to 40 mass %, further, more than or equal to 70 mass %, and further, more than or equal to 90 mass % of the negative electrode mixture layer.

As the negative active material, non-graphitizable carbon and a material other than non-graphitizable carbon may be used in combination. Examples of the material other than non-graphitizable carbon that may be used as the negative electrode active material include graphitizable carbon (soft carbon), graphite (natural graphite, artificial graphite, etc.), lithium titanium oxide (spinel type lithium titanium oxide or the like), silicon oxide, silicon alloy, tin oxide, and tin alloy.

The average particle diameter of the negative electrode active material (in particular, non-graphitizable carbon) is preferably 1 μm to 20 μm, and more preferably 2 μm to 15 μm from the viewpoint of high filling property of the negative electrode active material in the negative electrode and easy inhibition of side reaction with the electrolyte.

In the present specification, the average particle diameter means a volume-based median diameter ($D_{50}$) in a particle size distribution obtained by laser diffraction type particle size distribution measurement.

The negative electrode mixture layer contains a negative active material as an essential component and contains a conductive material, a binding material, and the like as optional components. Examples of the conductive agent include carbon black and carbon fiber. Examples of the binder include a fluorine resin, an acrylic resin, a rubber material, and a cellulose derivative.

The negative electrode mixture layer is formed, for example, by mixing a negative electrode active material, a conductive agent, a binder, and the like together with a dispersion medium to prepare a negative electrode mixture slurry, applying the negative electrode mixture slurry to a negative current collector, and then drying the negative electrode mixture slurry.

The negative electrode mixture layer is pre-doped with lithium ions. This doping decreases the potential of the negative electrode, and thus increases a difference in potential (that is, voltage) between the positive electrode and the negative electrode and improves energy density of the electrochemical device. The amount of lithium to be pre-doped may be, for example, about 50% to 95% of the maximum amount that can be occluded in the negative electrode mixture layer.

The electrostatic capacitance per unit mass of the negative electrode active material may be, for example, more than or equal 1,000 F/g. From the viewpoint of increasing the capacity density of the electrochemical device, the electrostatic capacitance per unit mass of the negative electrode active material may be, for example, less than or equal to 30,000 F/g. The electrostatic capacitance per unit mass of the negative electrode active material is usually larger than the electrostatic capacitance per unit mass of the positive electrode active material, and is, for example, 20 times to 800 times the electrostatic capacitance per unit mass of the positive electrode active material. The electrostatic capacitance per unit mass of the negative electrode active material may be measured by the following method.

First, a negative electrode for evaluation cut into a size of 31 mm×41 mm is prepared. As a counter electrode of the negative electrode, a metal lithium foil cut into a size of 40 mm×50 mm and having a thickness of 100 m is prepared. A negative electrode mixture layer and the metal lithium foil are opposed to each other with a cellulose paper manufactured by NIPPON KODOSHI CORPORATION (for example, product number TF4425) having a thickness of 25 m interposed therebetween as a separator to form an electrode body, and the electrode body is immersed in an electrolyte of Example 1 described later to assemble a cell.

The cell is charged at a constant current (CC) of 0.5 mA until the cell voltage reaches 0.01 V, then charged at a constant voltage (CV) for 1 hour, and then discharged at 0.5 mA until the cell voltage reaches 1.5 V. The electrostatic capacitance per unit mass of the negative electrode active material is determined from the discharge time during a potential change of 0.1 V from the potential of the negative electrode 1 minute after the start of discharging.

(Positive Electrode)

The positive electrode includes a positive current collector and a positive electrode mixture layer supported on the positive current collector. The positive electrode mixture layer contains a positive electrode active material reversibly doped with an anion. The positive electrode active material is, for example, a carbon material, a conductive polymer, or the like. The thickness of the positive electrode mixture layer is, for example, 10 μm to 300 μm per surface of the positive current collector.

A sheet-shaped metallic material is used as the positive current collector. The sheet-shaped metallic material may be a metal foil, a porous metal body, an etched metal, or the like. As the metallic material, aluminum, aluminum alloy, nickel, titanium, or the like may be used.

The positive current collecting plate is a metal plate having a substantially disk shape. It is preferable to form a through hole serving as a passage for the nonaqueous electrolyte in the center of the positive current collecting plate. The material of the positive current collecting plate is, for example, aluminum, aluminum alloy, titanium, stainless steel, or the like. The material of the positive current collecting plate may be the same as the material of the positive current collector.

As the carbon material used as the positive electrode active material, a porous carbon material is preferable. For example, activated carbon or a carbon material exemplified as the negative electrode active material (for example, non-graphitizable carbon) is preferable. Examples of the raw material of activated carbon include wood, coconut shell, coal, pitch, and phenol resin. The activated carbon is preferably subjected to an activation treatment.

The average particle diameter of the activated carbon is not particularly limited and is preferably less than or equal to 20 μm, and more preferably 3 μm to 15 μm.

The specific surface area of the positive electrode mixture layer roughly reflects the specific surface area of the positive electrode active material. The specific surface area of the positive electrode mixture layer may be, for example, in a range from 600 $m^2/g$ to 4,000 $m^2/g$ inclusive, and is desirably in a range from 800 $m^2/g$ to 3,000 $m^2/g$ inclusive. The specific surface area of the positive electrode mixture layer is a BET specific surface area determined using a measurement apparatus in accordance with JIS Z 8830 (for example, TriStar II 3020 manufactured by Shimadzu Corporation). Specifically, the electrochemical device is disassembled, and the positive electrode is taken out. Next, the positive electrode is washed with DMC and dried. Thereafter, the positive electrode mixture layer is peeled off from the positive current collector, and about 0.5 g of a sample of the positive electrode mixture layer is collected. Next, the specific surface area of the collected sample is determined according to the method for measuring the specific surface area of the negative electrode mixture layer described above.

The activated carbon desirably accounts for more than or equal to 50 mass %, further, more than or equal to 80 mass %, and further, more than or equal to 95 mass % of the positive electrode active material. The activated carbon desirably accounts for more than or equal to 40 mass %, further, more than or equal to 70 mass %, and further, more than or equal to 90 mass % of the positive electrode mixture layer.

The positive electrode mixture layer contains a positive electrode active material as an essential component, and contains a conductive material, a binding material, and the like as optional components. Examples of the conductive agent include carbon black and carbon fiber. Examples of the binder include a fluorine resin, an acrylic resin, a rubber material, and a cellulose derivative.

The positive electrode mixture layer is formed by, for example, mixing the positive electrode active material, the conductive agent, the binder, and the like with a dispersion medium to prepare a positive electrode mixture slurry, applying the positive electrode mixture slurry to the positive current collector, and thereafter drying the positive electrode mixture slurry.

The conductive polymer used as the positive electrode active material is preferably a π-conjugated polymer. As the π-conjugated polymer, for example, polypyrrole, polythiophene, polyfuran, polyaniline, polythiophene vinylene, polypyridine, or a derivative of these polymers may be used. These materials may be used alone or in combination of two or more. The weight-average molecular weight of the conductive polymer is, for example, 1,000 to 100,000. The derivative of the π-conjugated polymer means a polymer having, as a basic skeleton, a π-conjugated polymer such as polypyrrole, polythiophene, polyfuran, polyaniline, polythiophene vinylene, or polypyridine. For example, a polythiophene derivative includes poly(3,4-ethylenedioxythiophene) (PEDOT) or the like.

The conductive polymer is formed by, for example, immersing a positive current collector including a carbon layer in a reaction solution containing a raw material monomer of a conductive polymer, and electrolytically polymerizing the raw material monomer in the presence of the positive current collector. In the electrolytic polymerization, the positive current collector and a counter electrode may be immersed in a reaction solution containing a raw material monomer, and a current may be caused to flow between them with the positive current collector as an anode. The conductive polymer may be formed by a method other than electrolytic polymerization. For example, the conductive polymer may be formed by chemical polymerization of a raw material monomer. In the chemical polymerization, the raw material monomer may be polymerized with an oxidizing agent or the like in the presence of the positive current collector.

The raw material monomer used in electrolytic polymerization or chemical polymerization may be any polymerizable compound capable of producing a conductive polymer by polymerization. The raw material monomer may contain an oligomer. Examples of the raw material monomer that may be used include aniline, pyrrole, thiophene, furan, thiophene vinylene, pyridine, or a derivative of these monomers. These materials may be used alone or in combination of two or more. Among them, aniline is likely to grow on the surface of a carbon layer by electrolytic polymerization.

Electrolytic polymerization or chemical polymerization may be carried out using a reaction solution containing an anion (dopant). Excellent conductivity is exhibited by doping the π-electron conjugated polymer with a dopant. Examples of the dopant include a sulfate ion, a nitrate ion, a phosphate ion, a borate ion, a benzenesulfonate ion, a naphthalenesulfonate ion, a toluenesulfonate ion, a methanesulfonate ion, a perchlorate ion, a tetrafluoroborate ion, a hexafluorophosphate ion, and a fluorosulfate ion. The dopant may be a polymer ion. Examples of the polymer ion include ions of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid.

(Separator)

As the separator, a nonwoven fabric made of cellulose fiber, a nonwoven fabric made of glass fiber, a microporous film, woven fabric, or nonwoven fabric made of polyolefin, or the like may be used. The thickness of the separator is, for example, 8 μm to 300 μm, preferably 8 μm to 40 μm.

(Electrolyte)

The electrolyte has lithium ion conductivity and contains, for example, a lithium salt and a solvent that dissolves the lithium salt. The lithium salt anion is repeatedly and reversibly doped into and dedoped from the positive electrode. Lithium ions derived from the lithium salt are reversibly occluded in and released from the negative electrode.

Examples of the lithium salt include $LiClO_4$, $LiBF_4$, $LiPF_6$, $LiAlCl_4$, $LiSbF_6$, LiSCN, $LiCF_3SO_3$, $LiFSO_3$, $LiCF_3CO_2$, $LiAsF_6$, $LiB_{10}Cl_{10}$, LiCl, LiBr, LiI, $LiBCl_4$, $LiN(FSO_2)_2$, and $LiN(CF_3SO_2)_2$. These materials may be used alone or in combination of two or more. Among them, a salt having a fluorine-containing anion is preferable, and in particular, lithium bis(fluorosulfonyl)imide, that is, $LiN(SO_2F)_2$ is preferably used. The concentration of the lithium salt in the electrolyte in a charged state (charging rate (SOC) of 90% to 100%) is, for example, 0.2 mol/L to 5 mol/L. Hereinafter, $LiN(SO_2F)_2$ is referred to as LiFSI. For example, more than or equal to 80 mass % of the lithium salt may be LiFSI.

The increase rate of the low-temperature DCR tends to be remarkably decreased by using LiFSI. It is considered that LiFSI has an effect of reducing deterioration of the positive electrode active material and the negative electrode active material. Among salts having a fluorine-containing anion, FSI anion is considered to be excellent in stability, so that it is less likely to generate by-products but smoothly contribute to charging and discharging without damaging the surface of the active material. In particular, when the capacity of the positive electrode is increased and the specific surface area of the negative electrode mixture layer is increased, a remarkable effect of inhibiting deterioration (effect of inhibiting an increase in low-temperature DCR) is obtained by using LiFSI with which the influence of by-products on each active material is remarkably reduced.

Examples of the solvent that may be used include: cyclic carbonates such as ethylene carbonate, propylene carbonate, and butylene carbonate; chain carbonates such as dimethyl carbonate, diethyl carbonate, and ethyl methyl carbonate; aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethyl sulfoxide; 1,3-dioxolane; formamide; acetamide; dimethylformamide; dioxolane; acetonitrile; propionitrile; nitromethane; ethylmonoglyme; trimethoxymethane; sulfolane; methylsulfolane; and 1,3-propane sultone. These materials may be used alone or in combination of two or more.

The electrolyte may contain various additive agents as necessary. For example, an unsaturated carbonate such as vinylene carbonate, vinylethylene carbonate, or divinylethylene carbonate may be added as an additive agent for forming a lithium ion conductive coating film on the surface of the negative electrode.

EXAMPLES

Hereinafter, the present invention will be described in more detail by way of Examples, but the present invention is not limited to Examples. The outline of the configuration of each device produced below is shown in Table 1.

(Device A1)

(1) Production of Positive Electrode

An aluminum foil (positive current collector) having a thickness of 30 m was prepared. Activated carbon (average particle diameter: 5.5 μm) in an amount of 88 parts by mass as a positive electrode active material, 6 parts by mass of polytetrafluoroethylene as a binding material, and 6 parts by mass of acetylene black as a conductive material were dispersed in water to prepare a positive electrode mixture slurry. The obtained positive electrode mixture slurry was applied to both surfaces of the aluminum foil, the coating film was dried, and the obtained material was rolled to form a positive electrode mixture layer, whereby a positive electrode was obtained. A positive current collector exposed part having a width of 10 mm was formed at an end along a longitudinal direction of the positive current collector.

Mass Mp of the positive electrode active material supported on the unit area of the positive electrode was 3.7 $mg/cm^2$, the electrostatic capacitance of the positive electrode mixture layer was 90 F/g, and the BET specific surface area of the positive electrode mixture layer was 1,700 $m^2/g$.

(2) Production of Negative Electrode

A copper foil (negative current collector) having a thickness of 10 μm was prepared. Non-graphitizable carbon (average particle diameter: 5 μm) in an amount of 97 parts by mass, 1 part by mass of carboxycellulose, and 2 parts by mass of styrene-butadiene rubber were dispersed in water to prepare a negative electrode mixture slurry. The obtained negative electrode mixture slurry was applied to both surfaces of the copper foil, the coating film was dried, and the obtained material was rolled to form a negative electrode mixture layer, whereby a negative electrode was obtained.

Mass Mn of the negative electrode active material supported on the unit area of the negative electrode was 3.2 $mg/cm^2$ (that is, the Mp/Mn ratio was 1.1), the electrostatic capacitance of the negative electrode mixture layer was 5,000 F/g, and the BET specific surface area of the negative electrode mixture layer was 10 $m^2/g$.

Thereafter, a thin film of metal lithium for pre-doping was formed on the entire surface of the negative electrode mixture layer by vacuum deposition. The amount of lithium to be pre-doped was set such that the negative electrode potential in a nonaqueous electrolyte after the completion of pre-doping was less than or equal to 0.2 V with respect to metal lithium.

Thereafter, the inside of the chamber of the apparatus was purged with carbon dioxide to form a carbon dioxide gas atmosphere, whereby a first layer containing lithium carbonate on the surface layer part of the negative electrode mixture layer was formed. The dew point of the carbon dioxide gas atmosphere was −40° C., the molar fraction of carbon dioxide was 100%, and the pressure inside the chamber was 1 atm ($1.01\times10^5$ Pa). The temperature of the negative electrode exposed to the carbon dioxide gas atmosphere of 1 atm was set to 25° C. The time for exposing the negative electrode to the carbon dioxide gas atmosphere was set to 22 hours. The first layer was substantially free from F (or LiF).

(3) Production of Electrode Body

An electrode body was formed by winding the positive electrode and the negative electrode in a columnar shape with a cellulose nonwoven fabric separator (with a thickness 25 μm) interposed therebetween. At this time, the positive current collector exposed part was projected from one end surface of the wound body, and the negative current collector exposed part was projected from the other end surface of the electrode body. A disk-shaped positive current collecting plate and a disk-shaped negative current collecting plate were welded to the positive current collector exposed part and the negative current collector exposed part, respectively.

(4) Preparation of Nonaqueous Electrolytic Solution

A solvent was prepared by adding 0.2 mass % of vinylene carbonate to a mixture of propylene carbonate and dimethyl carbonate in a volume ratio of 1:1. LiFSI was dissolved as a lithium salt in the obtained solvent at a concentration of 1.2 mol/L to prepare a nonaqueous electrolyte.

(5) Assembly of Electrochemical Device

The electrode body was housed in a bottomed cell case with an opening, the tab lead connected to the positive current collecting plate was connected to the inner surface of the sealing plate, and the negative current collecting plate was welded to the inner bottom surface of the cell case. The nonaqueous electrolyte was put into the cell case, and then, the opening of the cell case was closed with the sealing plate. An electrochemical device as illustrated in FIG. 1 was thus assembled.

Thereafter, aging was performed at 60° C. while a charge voltage of 3.8 V was applied between terminals of the positive electrode and the negative electrode to complete pre-doping of lithium ions to the negative electrode.

(6) Evaluation

[Evaluation 1]

<XPS Analysis of First Layer>

The surface layer part of the negative electrode mixture layer after exposure to a carbon dioxide gas atmosphere was analyzed for C1s spectrum, O1s spectrum, and Li1s spectrum by XPS. An X-ray photoelectron spectrometer (product name: Model 5600, manufactured by ULVAC-PHI, Inc.) was used for the analysis. The measurement conditions were as follows.

X-ray source: Al-mono (1486.6 eV) 14 kV/200 W

Measurement diameter: 800 μmφ

Photoelectron extraction angle: 45°

Etching conditions: accelerating voltage 3 kV, etching rate about 3.1 nm/min (in terms of $SiO_2$), raster area 3.1 mm×3.4 mm As a result of analysis of the C1s spectrum, the O1s spectrum, and the Li1s spectrum, it was confirmed that the thickness of the first layer was approximately 18 nm. Specifically, a peak such as the C—C bond inferred to be impurity carbon was observed on the outermost surface, but the peak sharply decreased near the depth of 1 nm to 2 nm of the first layer. On the other hand, a first peak attributed to the C═O bond was observed from the outermost surface of the surface layer part to a depth of 18 nm. A peak attributed to the Li—O bond was also observed near the depth of 18 nm. Further, the presence of Li was confirmed steadily from the outermost surface of the surface layer part to a depth of 18 nm. No peak attributed to LiF was observed.

[Evaluation 2]

The surface layer part of the negative electrode mixture layer of the negative electrode taken out from the electrochemical device was subjected to XPS analysis in the same manner as described above, and it was confirmed that an SEI film (second layer) having a composition different from that of the first layer and a thickness of 10 nm distinguished from the first layer was formed. In addition, a peak attributed to LiF was observed.

[Evaluation 3]

(Measurement of Capacity of Electrochemical Device)

The electrochemical device immediately after aging was subjected to constant current charging at a current density of 2 mA/cm$^2$ per positive electrode area under an environment of −30° C. until the voltage reached 3.8 V, and then a state in which the voltage of 3.8 V was applied was maintained for 10 minutes. Thereafter, under an environment of −30° C., constant current discharging was performed at a current density of 2 mA/cm$^2$ per positive electrode area until the voltage reached 2.2 V. The time t (sec) required for the voltage to drop from 3.3 V to 3.0 V in the discharging was measured. Initial capacity C1 of the electrochemical device was determined from formula (A) shown below using the measured time t.

$$\text{Capacity } C1 = Id \times t/V \qquad (A)$$

In formula (A), Id is a current value (current density per positive electrode area: 2 mA/cm$^2$×positive electrode area) at the time of discharging, and V is a value obtained by subtracting 3.0 V from 3.3 V (0.3 V). The evaluation results are shown in Table 2.

(Measurement of Internal Resistance of Electrochemical Device)

Next, using the discharge curve (vertical axis: discharge voltage, horizontal axis: discharge time) obtained by the above discharging, a first-order approximate straight line in the range of from 0.5 seconds to 2 seconds after the start of discharging of the discharge curve was obtained, and voltage VS of an intercept of the approximate straight line was obtained. A value (V0−VS) obtained by subtracting voltage VS from voltage V0 at the start of discharging (when 0 second has elapsed from the start of discharging) was obtained as ΔV. Internal resistance (DCR) R1 (Ω) of the electrochemical device was determined from formula (B) shown below using ΔV (V) and a current value (current density per positive electrode area: 2 mA/cm$^2$×positive electrode area) at the time of discharging. The evaluation results are shown in Table 2.

$$\text{Internal resistance } R1 = \Delta V/Id \qquad (B)$$

(Float Test of Electrochemical Device)

Next, a float test was performed in which the electrochemical device was held in an environment of 85° C. for 1,000 hours in a state where a constant voltage of 3.8 V was applied to the electrochemical device, thereafter, the low-temperature DCR was determined in the same manner, and the low-temperature DCR increase rate was determined from the difference (ΔDCR) between the initial low-temperature DCR and the low-temperature DCR after repeated charging and discharging. The evaluation results are shown in Table 2.

(Devices A2 to A7)

Devices A2 to A7 were assembled and evaluated in the same manner as in device A1 except that Mp and Mn were changed as follows to change the Mp/Mn ratio as shown in Table 1. The results are shown in Table 2.

(Device A2)

Mass Mp of the positive electrode active material supported on the unit area of the positive electrode was set to 3.0 mg/cm$^2$, and mass Mn of the negative electrode active material supported on the unit area of the negative electrode was set to 4.2 mg/cm$^2$ (thus, the Mp/Mn ratio was 0.7).

(Device A3)

Mass Mp of the positive electrode active material supported on the unit area of the positive electrode was set to 3.9 mg/cm$^2$, and mass Mn of the negative electrode active material supported on the unit area of the negative electrode was set to 2.8 mg/cm$^2$ (thus, the Mp/Mn ratio was 1.4).

(Device A4)

Mass Mp of the positive electrode active material supported on the unit area of the positive electrode was set to 4.1 mg/cm$^2$, and mass Mn of the negative electrode active material supported on the unit area of the negative electrode was set to 2.6 mg/cm$^2$ (thus, the Mp/Mn ratio was 1.6).

(Device A5)

Mass Mp of the positive electrode active material supported on the unit area of the positive electrode was set to 4.2 mg/cm$^2$, and mass Mn of the negative electrode active material supported on the unit area of the negative electrode was set to 2.3 mg/cm$^2$ (thus, the Mp/Mn ratio was 1.8).

(Device A6)

Mass Mp of the positive electrode active material supported on the unit area of the positive electrode was set to 4.5 mg/cm$^2$, and mass Mn of the negative electrode active material supported on the unit area of the negative electrode was set to 1.8 mg/cm$^2$ (thus, the Mp/Mn ratio was 2.5).

(Device A7)

Mass Mp of the positive electrode active material supported on the unit area of the positive electrode was set to 4.8 mg/cm$^2$, and mass Mn of the negative electrode active material supported on the unit area of the negative electrode was set to 1.3 mg/cm$^2$ (thus, the Mp/Mn ratio was 3.7).

(Devices B1 to B7)

Devices B1 to B7 were assembled and evaluated in the same manner as in device A1 except that the Mp/Mn ratio was fixed to 1.6 and the specific surface area of the negative electrode mixture layer was changed as shown in Table 1. The results are shown in Table 2. The specific surface area of the negative electrode mixture layer was changed by changing the specific surface area of the non-graphitizable carbon.

(Devices C1 to C5)

Devices C1 to C5 were assembled and evaluated in the same manner as in device A1 except that the Mp/Mn ratio was fixed to 1.6, the specific surface area of the negative electrode mixture layer was fixed to 50 m$^2$/g, and the thickness of the first layer was changed as shown in Table 1. The results are shown in Table 2. The thickness of the first layer was changed by changing the time for exposing the negative electrode to the carbon dioxide gas atmosphere. Note that, in device C1, the negative electrode mixture layer was not purged with carbon dioxide in the chamber after vapor deposition of metal lithium. Thus, the first layer is not formed on the negative electrode of device C1.

(Device D1)

Device D1 was assembled and evaluated in the same manner as in device A1 except that graphite (average particle diameter: 7 μm) was used as the negative electrode active material instead of the non-graphitizable carbon and the Mp/Mn ratio was set to 1.6. The results are shown in Table 2.

(Device D2)

Device D2 was assembled and evaluated in the same manner as in device A1 except that graphite (average particle diameter: 7 μm) was used as the negative electrode active material instead of the non-graphitizable carbon, the Mp/Mn ratio was set to 1.6, and the specific surface area of the negative electrode mixture layer was set to 50 $m^2/g$. The results are shown in Table 2.

(Device D3)

Device D3 was assembled and evaluated in the same manner as in device D2 except that the negative electrode mixture layer was not purged with carbon dioxide in the chamber after vapor deposition of metal lithium. Thus, the first layer is not formed on the negative electrode of device D3. The results are shown in Table 2.

(Device E1)

Device E1 was assembled and evaluated in the same manner as in device A1 except that the Mp/Mn ratio was set to 1.6, the specific surface area of the negative electrode mixture layer was set to 50 $m^2/g$, and $LiPF_6$ was used as the lithium salt of the electrolyte instead of LiFSI. The results are shown in Table 2.

(Device E2)

Device E2 was assembled and evaluated in the same manner as in device A2 except that the Mp/Mn ratio was set to 0.7, the specific surface area of the negative electrode mixture layer was set to 50 $m^2/g$, and $LiPF_6$ was used as the lithium salt of the electrolyte instead of LiFSI. The results are shown in Table 2.

In Table 1, "HC" represents "non-graphitizable carbon (hard carbon)". In Table 2, the evaluation results are indicated by an index numbers when the evaluation result of device D1 is 100. For the low-temperature electrostatic capacitance, a larger value is more desirable. For the low-temperature DCR and the DCR increase rate, a smaller value is more desirable.

TABLE 1

| | | | Negative electrode mixture layer | | | | |
|---|---|---|---|---|---|---|---|
| Device | Mp/Mn | Negative electrode active material | Specific surface area m2/g | First layer Presence or absence | Thickness of first layer nm | Thickness of second layer nm | Electrolyte Li salt |
| D1 | 1.6 | Graphite | 10 | Present | 18 | 10 | LiFSI |
| A2 | 0.7 | HC | ↑ | ↑ | ↑ | ↑ | LiFSI |
| A1 | 1.1 | ↑ | ↑ | ↑ | ↑ | ↑ | LiFSI |
| A3 | 1.4 | ↑ | ↑ | ↑ | ↑ | ↑ | LiFSI |
| A4 | 1.6 | ↑ | ↑ | ↑ | ↑ | ↑ | LiFSI |
| A5 | 1.8 | ↑ | ↑ | ↑ | ↑ | ↑ | LiFSI |
| A6 | 2.5 | ↑ | ↑ | ↑ | ↑ | ↑ | LiFSI |
| A7 | 3.7 | ↑ | ↑ | ↑ | ↑ | ↑ | LiFSI |
| B1 | 1.6 | HC | 4 | Present | 18 | ↑ | LiFSI |
| B2 | 1.6 | ↑ | 10 | ↑ | ↑ | ↑ | LiFSI |
| B3 | 1.6 | ↑ | 25 | ↑ | ↑ | ↑ | LiFSI |
| B4 | 1.6 | ↑ | 30 | ↑ | ↑ | ↑ | LiFSI |
| B5 | 1.6 | ↑ | 50 | ↑ | ↑ | ↑ | LiFSI |
| B6 | 1.6 | ↑ | 70 | ↑ | ↑ | ↑ | LiFSI |
| B7 | 1.6 | ↑ | 85 | ↑ | ↑ | ↑ | LiFSI |
| D2 | 1.6 | Graphite | 50 | 1 | ↑ | ↑ | LiFSI |
| C1 | 1.6 | HC | 50 | Absent | — | ↑ | LiFSI |
| C2 | 1.6 | ↑ | ↑ | Present | 1 | 10 | LiFSI |
| C3 | 1.6 | ↑ | ↑ | ↑ | 18 | ↑ | LiFSI |
| C4 | 1.6 | ↑ | ↑ | ↑ | 50 | ↑ | LiFSI |
| C5 | 1.6 | ↑ | ↑ | ↑ | 63 | ↑ | LiFSI |
| D3 | 1.6 | Graphite | ↑ | Absent | — | ↑ | LiFSI |
| E1 | 1.6 | HC | ↑ | Present | 18 | ↑ | LiPF6 |
| E2 | 0.7 | HC | ↑ | Present | 18 | ↑ | LiPF6 |

TABLE 2

| Device | Low-temperature electrostatic capacitance (−30° C.) F | Low-temperature DCR (−30° C.) mΩ | DCR increase rate % |
|---|---|---|---|
| D1 | 100 | 100 | 100 |
| A2 | 74 | 47 | 52 |
| A1 | 88 | 56 | 52 |
| A3 | 93 | 62 | 53 |
| A4 | 98 | 70 | 54 |
| A5 | 102 | 76 | 54 |
| A6 | 105 | 89 | 56 |
| A7 | 113 | 121 | 143 |
| B1 | 99 | 116 | 52 |
| B2 | 98 | 70 | 54 |
| B3 | 99 | 50 | 55 |
| B4 | 99 | 46 | 55 |
| B5 | 101 | 39 | 55 |
| B6 | 99 | 35 | 63 |
| B7 | 99 | 32 | 119 |
| D2 | 100 | 78 | 95 |
| C1 | 100 | 42 | 78 |
| C2 | 101 | 39 | 61 |
| C3 | 101 | 39 | 55 |
| C4 | 101 | 38 | 56 |
| C5 | 101 | 48 | 75 |
| D3 | 99 | 80 | 114 |
| E1 | 101 | 38 | 143 |
| E2 | 74 | 47 | 52 |

From a comparison between devices A1 to A7, it can be understood that the low-temperature electrostatic capacitance increases as the Mp/Mn ratio increases. However, in consideration of the balance with the low-temperature DCR, it is found that the Mp/Mn ratio is desirably in the range of from 1.1 to 2.5, and more desirably in the range of from 1.4 to 1.8.

A comparison between devices B1 to B7 shows that the low-temperature DCR decreases and the DCR increase rate increases as the specific surface area of the negative electrode mixture layer increases. In consideration of the balance between the low-temperature DCR and the DCR increase rate, it is found that the specific surface area of the negative electrode mixture layer is desirably 10 $m^2/g$ to 70 $m^2/g$, and more desirably 25 $m^2/g$ to 50 $m^2/g$.

A comparison between devices C1 to C5 shows that the DCR increase rate is remarkably reduced by providing the first layer, even when the specific surface area of the negative electrode mixture layer is considerably large. This is considered to be because, by forming the first layer, the state of the second layer is stabilized when charging and discharging are repeated, and the reliability of the negative electrode improves. In addition, it is found that a remarkable effect can be obtained with the second layer having a small thickness as long as the thickness of the first layer is not extremely large.

It can be understood that it is difficult to reduce the low-temperature DCR and the DCR increase rate in devices D1 to D3 because graphite is used for the negative electrode active material. In addition, from a comparison between devices C3 and E1, it can be understood that LiFSI is effective as the lithium salt of the electrolyte. On the other hand, from a comparison between devices A2 and E2, it can be understood that there is no advantage of using LiFSI when the Mp/Mn ratio is less than 1.1, and the advantage of using LiFSI is obtained when the Mp/Mn ratio is increased.

The invention claimed is:

1. An electrochemical device comprising:

a positive electrode;

a negative electrode; and an electrolyte having lithium ion conductivity, wherein:

the positive electrode includes a positive current collector and a positive electrode mixture layer supported on the positive current collector, the positive electrode mixture layer contains a positive electrode active material reversibly doped with an anion, the negative electrode includes a negative current collector and a negative electrode mixture layer supported on the negative current collector, the negative electrode mixture layer contains a negative electrode active material reversibly doped with lithium ions, the negative electrode active material contains non-graphitizable carbon, a ratio Mp/Mn of a mass Mp of the positive electrode active material supported on a unit area of the positive electrode to a mass Mn of the negative electrode active material supported on a unit area of the negative electrode is in a range from 1.1 to 2.5, inclusive, a surface layer part of the negative electrode mixture layer includes a first layer containing lithium carbonate and a second layer containing a solid electrolyte, and at least a part of the second layer covers at least a part of a surface of the negative electrode active material with the first layer interposed between the second layer and the negative electrode active material.

2. The electrochemical device according to claim 1, wherein the ratio Mp/Mn is in a range from 1.4 to 1.8, inclusive.

3. The electrochemical device according to claim 1, wherein a specific surface area of the negative electrode mixture layer is in a range from 10 $m^2/g$ to 70 $m^2/g$, inclusive.

4. The electrochemical device according to claim 3, wherein the specific surface area of the negative electrode mixture layer is in a range from 25 $m^2/g$ to 50 $m^2/g$, inclusive.

5. The electrochemical device according to claim 1, wherein:

the second layer contains lithium carbonate, and a content of the lithium carbonate contained in the second layer is smaller than a content of the lithium carbonate contained in the first layer.

6. The electrochemical device according to claim 1, wherein the first layer has a thickness in a range from 1 nm to 50 nm, inclusive.

7. The electrochemical device according to claim 1, wherein:

when the first layer is measured by X-ray photoelectron spectroscopy, a substantial F1s peak attributed to a LiF bond is not observed, and when the second layer is measured by X-ray photoelectron spectroscopy, a substantial F1s peak attributed to a LiF bond is observed.

8. The electrochemical device according to claim 1, wherein the electrolyte having lithium ion conductivity includes lithium bis(fluorosulfonyl)imide: $LiN(SO_2F)_2$.

9. An electrochemical device comprising:

a positive electrode;

a negative electrode; and an electrolyte having lithium ion conductivity, wherein:

the positive electrode includes a positive current collector and a positive electrode mixture layer supported on the positive current collector, the positive electrode mixture layer contains a positive electrode active material, the positive electrode active material including an activated carbon accounting for more than or equal to 50 mass % of the positive electrode active material, the negative electrode includes a negative current collector and a negative electrode mixture layer supported on the negative current collector, the negative electrode mixture layer contains a negative electrode active material reversibly doped with lithium ions, the negative electrode active material contains non-graphitizable carbon, a ratio Mp/Mn of a mass Mp of the positive electrode active material supported on a unit area of the positive electrode to a mass Mn of the negative electrode active material supported on a unit area of the negative electrode is in a range from 1.1 to 2.5, inclusive, a surface layer part of the negative electrode mixture layer includes a first layer containing lithium carbonate and a second layer containing a solid electrolyte, and at least a part of the second layer covers at least a part of a surface of the negative electrode active material with the first layer interposed between the second layer and the negative electrode active material.

10. The electrochemical device according to claim 9, wherein the ratio Mp/Mn is in a range from 1.4 to 1.8, inclusive.

11. The electrochemical device according to claim 9, wherein:

the second layer contains lithium carbonate, and a content of the lithium carbonate contained in the second layer is smaller than a content of the lithium carbonate contained in the first layer.

12. The electrochemical device according to claim 9, wherein the first layer has a thickness in a range from 1 nm to 50 nm, inclusive.

13. The electrochemical device according to claim 9, wherein:

when the first layer is measured by X-ray photoelectron spectroscopy, a substantial F1s peak attributed to a LiF bond is not observed, and when the second layer is measured by X-ray photoelectron spectroscopy, a substantial F1s peak attributed to a LiF bond is observed.

14. The electrochemical device according to claim 9, wherein the electrolyte having lithium ion conductivity includes lithium bis(fluorosulfonyl)imide: $LiN(SO_2F)_2$.

15. An electrochemical device comprising:

a positive electrode;

a negative electrode; and an electrolyte having lithium ion conductivity, wherein:

the positive electrode includes a positive current collector and a positive electrode mixture layer supported on the positive current collector, the positive electrode mixture layer contains a positive electrode active material adsorbing an anion, the negative electrode includes a negative current collector and a negative electrode mixture layer supported on the negative current collector, the negative electrode mixture layer contains a negative electrode active material reversibly doped with lithium ions, the negative electrode active material contains non-graphitizable carbon, a ratio Mp/Mn of a mass Mp of the positive electrode active material supported on a unit area of the positive electrode to a mass Mn of the negative electrode active material supported on a unit area of the negative electrode is in a range from 1.1 to 2.5, inclusive, a surface layer part of the negative electrode mixture layer includes a first layer containing lithium carbonate and a second layer containing a solid electrolyte, and at least a part of the second layer covers at least a part of a surface of the negative electrode active material with the first layer interposed between the second layer and the negative electrode active material.

16. The electrochemical device according to claim 15, wherein the ratio Mp/Mn is in a range from 1.4 to 1.8, inclusive.

17. The electrochemical device according to claim 15, wherein:

the second layer contains lithium carbonate, and a content of the lithium carbonate contained in the second layer is smaller than a content of the lithium carbonate contained in the first layer.

18. The electrochemical device according to claim 15, wherein the first layer has a thickness in a range from 1 nm to 50 nm, inclusive.

19. The electrochemical device according to claim 15, wherein:

when the first layer is measured by X-ray photoelectron spectroscopy, a substantial F1s peak attributed to a LiF bond is not observed, and when the second layer is measured by X-ray photoelectron spectroscopy, a substantial F1s peak attributed to a LiF bond is observed.

20. The electrochemical device according to claim 15, wherein the electrolyte having lithium ion conductivity includes lithium bis(fluorosulfonyl)imide: $LiN(SO_2F)_2$.

* * * * *